Feb. 26, 1957  L. S. GREENLAND ET AL  2,783,006
FEEL SIMULATOR FOR AIRCRAFT
Filed Feb. 1, 1954  5 Sheets-Sheet 1

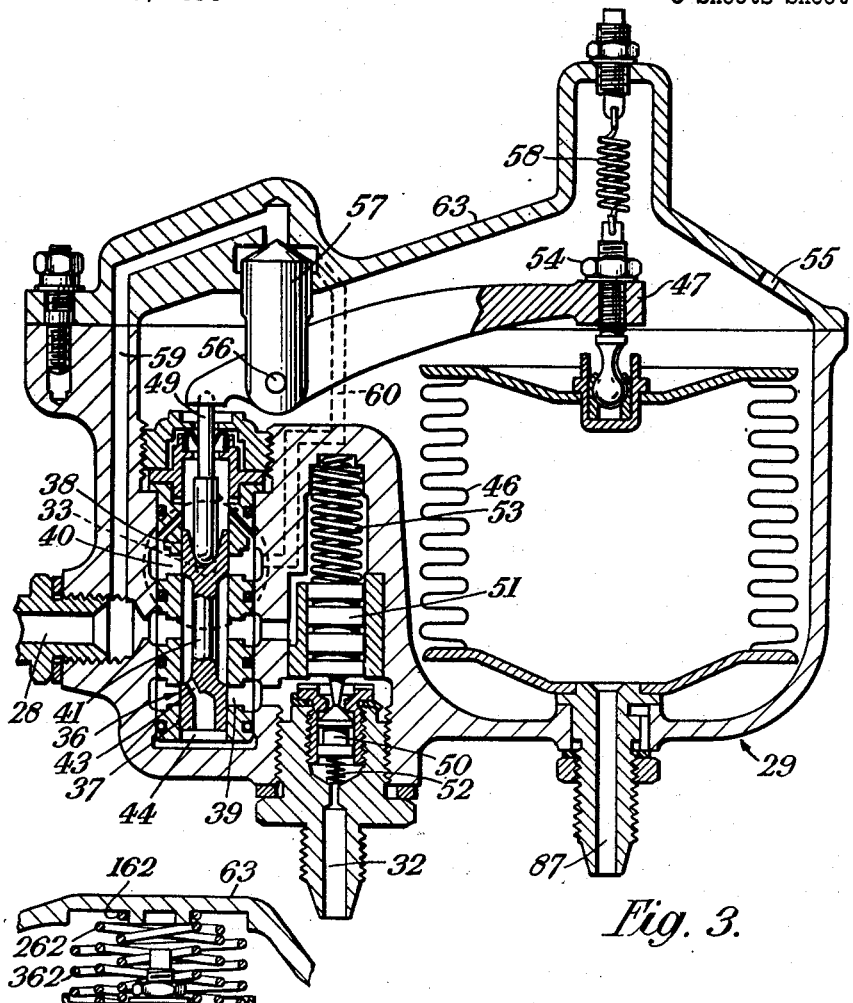
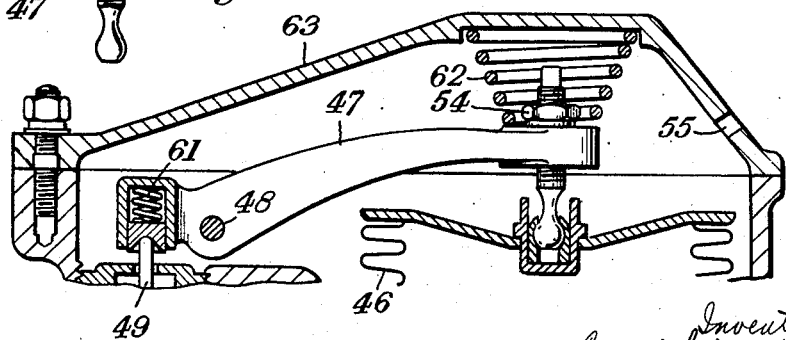

2,783,006

FEEL SIMULATOR FOR AIRCRAFT

Leonard Sidney Greenland, Wolverhampton, and Roy Westbury, Bridgnorth, England, and Charles Philip Smith, Ramsey, Isle of Man, assignors to H. M. Hobson Limited, London, England, a company of Great Britain Application February 1, 1954, Serial No. 407,536

Claims priority, application Great Britain February 2, 1953

15 Claims. (Cl. 244—83)

In aircraft fitted with power-operated control surfaces, or in which the control surfaces are operated by servo tabs, the aerodynamic loads on the control surfaces are not felt by the pilot, and it is known to provide the pilot with a feel simulator which will impose on his controls loads representative of the aerodynamic loading on the control surfaces.

This invention relates to a feel simulator of the type comprising a pilot's control member, a linkage operable by the control member to effect relative movement of a piston and a housing for the piston and thereby to displace liquid from the housing, against a hydraulic resistance, said linkage being such that the hydraulic resistance opposing movement of the control member increases with displacement of the control member in either direction from a neutral position, a control valve for controlling the hydraulic pressure prevailing in the housing and a device responsive to changes in airspeed which is operative on the valve to establish in the housing a hydraulic pressure which varies as a function of airspeed.

According to the invention, the control valve of a feel simulator of this type is subject to the hydraulic pressure in the housing and also to a force opposing the hydraulic pressure and applied to the control valve by the airspeed-responsive device, the control valve normally closing the outlet for liquid from the housing, being movable from its normal position to increase or decrease the hydraulic pressure in the housing, in response respectively to increase or decrease in the airspeed over a predetermined range of airspeeds and also being movable from its normal position, to permit liquid to flow from and to the housing, in response respectively to movement of the control member from and towards its neutral position.

Preferably the control valve is a piston valve coacting with pressure and exhaust ports for respectively supplying liquid to and exhausting liquid from the housing.

Preferably the airspeed-responsive device is a bellows or diaphragm subject at one side to ram pressure and at the other to atmospheric pressure. Thus it may be constituted by a bellows, exposed internally to ram pressure and externally to atmospheric pressure. The hydraulic pressure in the housing will then be proportional to pitot pressure, i. e. proportional to $V^2$, where V is the airspeed. As later explained, however, the effect of the bellows on the control valve may be modified to cause the hydraulic pressure in the housing to be proportional to V or to some power of V other than $V^2$. Provision may also be made for the hydraulic pressure in the housing to be maintained at a constant value at low airspeeds, the airspeed-responsive device coming into action only when a certain predetermined minimum airspeed is reached.

It will be appreciated that a single control valve and airspeed-responsive device may be utilised to control the hydraulic pressure supplied to three pistons, respectively opposing movement of the pilot's control members allocated to the three axes of control.

Certain embodiments of the invention will now be described in more detail, with reference to the accompanying diagrammatic drawings, in which:

Figs. 3–7 are similar views showing modifications of the apparatus shown in Fig. 2.

Like reference numerals indicate like parts throughout the figures.

Figure 1:
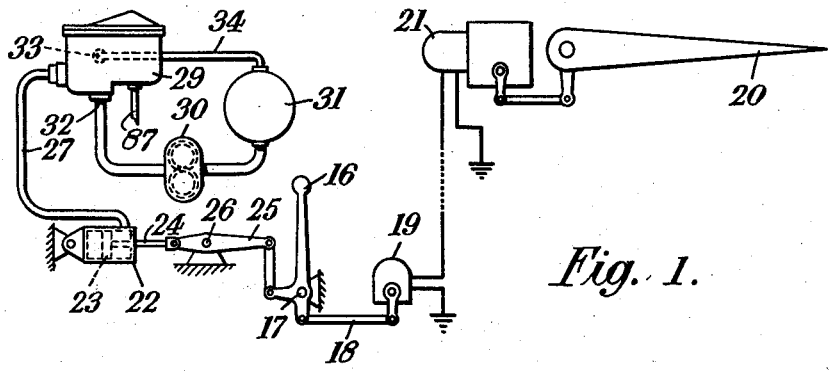
Fig. 1 is a diagram showing a typical installation according to the invention.

Turning first to Fig. 1, this shows diagrammatically a pilot's control member 16, pivoted at 17, and coupled by a connection 18 to the transmitter 19 of a servo mechanism for actuating the control surface 20 of an aircraft, the receiver of the servo mechanism being indicated at 21. As will be well understood the servo mechanism 19, 21 serves to displace the control surface 20 in a direction and to an extent determined by the movement of the control member 16 from a neutral position.

Figure 2:
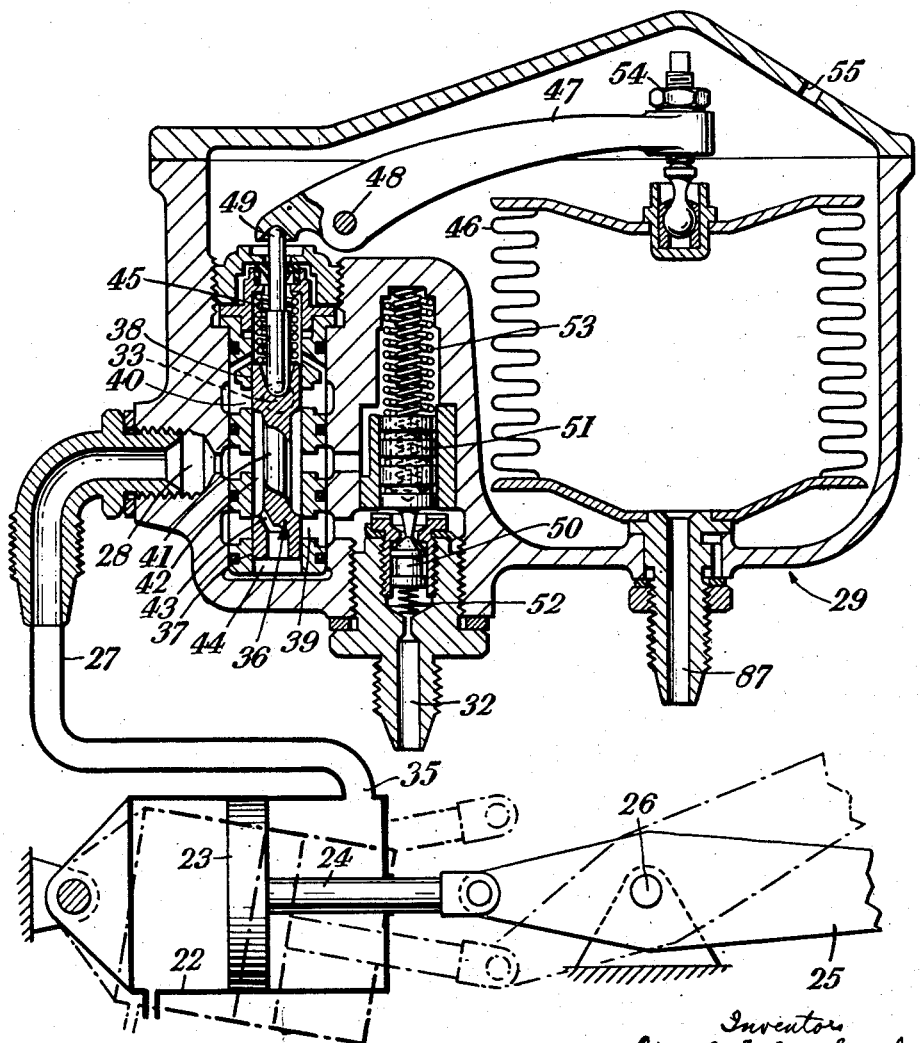
Fig. 2 is a longitudinal section view of a first form of feel simulator.

The feel simulator comprises a hydraulic cylinder 22 (see also Fig. 2) containing a piston 23, the piston rod 24 being connected to the control member 16 by a lever 25, pivoted intermediately at 26 and pivoted at its ends to the control member and to the piston rod respectively. Movement of the control member 16 in either direction away from its neutral position will draw the piston 23 to the right (as seen in Fig. 2) to expel liquid from the cylinder 22 through an outlet 35, connected by a conduit 27 to a port 28 in a unit 29, which determines the hydraulic pressure prevailing in the cylinder 22, herein referred to as the control pressure. A pump 30 (Fig. 1) drawing liquid from a reservoir 31, supplies liquid under pressure to the inlet 32 of the unit 29, which has an exhaust outlet 33 communicating, via a conduit 34, with the reservoir 31.

As will be apparent from Fig. 2, the lever 25 works at a progressively decreasing mechanical advantage as the control member 16 is moved away from its neutral position. Consequently the hydraulic resistance to movement of the control member 16, and therefore the feel imparted by the feel generator, increase with displacement of the control member. The feel is also varied in accordance with changes in airspeed by the unit 29 as will now be described.

The unit 29 contains a piston type control valve 36 (Fig. 2) for determining the control pressure prevailing in the cylinder 22. The valve 36 has lands 37, 38 coacting respectively with a pressure port 39 and a port 40 connected to the exhaust outlet 33. It also has a waisted portion 41, and the space 42 surrounding the waisted portion communicates with the port 28 and therefore with the cylinder 22. A passage 43 connects the space 44 beneath the valve with the space 42, and the valve 36 is thus subjected at its lower end to the control pressure. It is normally held balanced in the neutral position shown in Fig. 2 by the pressure of a spring 45, assisted by the downward pressure applied to the valve by a bellows 46, which acts on the valve through the agency of a lever 47, pivoted on a fixed pivot 48 and acting on the valve 36 through a push rod 49.

The unit 29 has an inlet valve 50 and a pressure differential valve 51, which effect a first stage reduction in the pressure, this reduced pressure being applied to the port 39, and the control valve 36 effects a second stage reduction in the pressure before it is applied to the piston 23. The inlet valve 50 is normally held closed by a spring 52. The pressure differential valve 51 is subjected at its undersurface to the pressure at the inlet port 39 and at its upper surface to the control pressure and to the pressure of a spring 53. It acts to maintain at the inlet port 39 a reduced pressure at a value exceeding the value of the control pressure by a predetermined amount determined by the load of the spring 53. When the control valve 36 moves down, to connect the port 28 to the inlet port 39, liquid will flow into the conduit 27 to increase the control pressure. At the same time, the resulting fall of pressure beneath the valve 51 will cause the latter to move down to open the inlet valve 50 and allow liquid at high pressure to pass from the inlet 32 to the port 39. The valve 51 returns to the position shown, allowing the inlet valve 50 to close, as soon as the pressure at the inlet 39 again exceeds the control pressure by the predetermined amount. When the valve 36 moves to reduce the control pressure, the pressure at the inlet port 39 gradually falls to the predetermined excess value by leakage of liquid past the valves 36, 51. The first stage pressure reduction is only necessary in the case when a high inlet pressure is applied to the inlet 32. As will be apparent, movement of the piston 23 to the right, as seen in Fig. 2, causes the valve 36 to lift, allowing the piston 23 to displace liquid from the cylinder 22 to the exhaust outlet 33. When the pilot's control member is returned to its neutral position, the piston 23 moves to the left, and the valve 36 descends allowing liquid to flow from the pressure port 39 into the cylinder 22 until the control pressure has returned to a value sufficient to restore the valve 36 to its neutral position.

Figure 13:
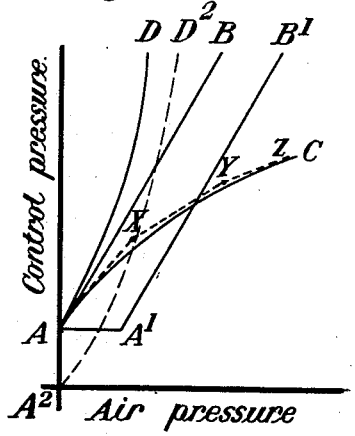

Ram air pressure entering the unit 29 by an inlet 87 tends to extend the bellows 46, which is subject externally to atmospheric pressure applied through an inlet 55. The bellows 46, acting through lever 47, imposes a force on the push rod 49 of the control valve 36. This urges the valve 36 to uncover the inlet port 39, allowing pressure to build up in the space 44 sufficient to restore the balance of forces across the valve 36. Consequently a control pressure is applied to the piston varying in linear relation to the differential pressure (i. e. pitot pressure) acting on the bellows 46 as represented by the line AB in Fig. 13.

If required it can be arranged that at low air speeds the lever 47 is out of contact with the push rod 49 by appropriate setting of the bellows 46 and over this range the hydraulic pressure is maintained at a constant low value by the action of the spring 45. Thus at aircraft take-off and landing speeds, as shown by line AA'B' in Fig. 13, the feel becomes a function of the position of the control member only, unmodified by speed. This change in setting of the bellows 46 may be effected by adjustment of the nut and bolt connection 54 by which it is attached to the lever 47.

The arrangement of Fig. 3 is generally similar to that of Fig. 2. In this case, however, the lever 47 is not pivoted on a fixed pivot, but is pivoted at 56 to a relief valve 57. Also, the compression spring 45 acting on the upper end of the valve 36 in Fig. 2 is replaced by a tension spring 58 acting on the right hand end of the lever 47. The relief valve 57 is subject at its upper end to the control pressure through a conduit 59.

The function of the relief valve 57 is to provide a safeguard against seizure of the control valve 36. Under high speed flight conditions, small movements only of the control member are used and the resistance to motion provided by the feel simulator is such that the pilot is physically incapable of applying large control angles except at low air speeds.

If, however, the valve 36 should seize with its pressure port 39 open, high aircraft speed conditions would be simulated and it would be impossible for the pilot to apply control movements suitable for landing. The seat area of the relief valve 57 is so proportioned that this valve will lift at control pressures slightly in excess, say by 10 to 15%, of the normal maximum controlled value and thus it provides a complete safeguard. When the relief valve 57 opens, liquid can flow from the cylinder 22 to exhaust through the conduits 27, 59, 60. The tension spring 58 serves to hold the relief valve 57 closed against the control pressure prevailing in the cylinder 22 at zero speed.

In both of the constructions so far described, the pitot pressure in the bellows 46, and therefore the control pressure, will be proportional to $\frac{1}{2}\rho V^2$. There are cases where it is required that the feel should be proportional to V or some power of V lower than $V^2$.

Fig. 4 shows a method of achieving this. In the arrangements so far described, the lever 47 will maintain at any airspeed a fixed position, unless the pilot's control member is actually being moved. With the arrangement shown in Figure 4, however, a flexible element in the form of a spring 61 is introduced between the lever 47 and the push rod 49 and the lever 47 will therefore deflect progressively anti-clockwise as the pressure in the bellows 46 is increased. To achieve feel forces directly proportional to V, a further spring 62, having a square law deflection curve, is introduced between the lever 47 and the casing of the unit. Thus, as the pressure in the bellows is increased, an increasing proportion of the bellows load is reacted on to the casing 63 of the unit, instead of on to the control valve 36, and the load on the latter is directly proportional to the forward speed V of the aircraft.

By varying the rate law of the spring 62, the pilot's load can be made responsive to any desired characteristic, e. g. $V^{1.5}$. Such an altered characteristic is shown by the curve AC in Fig. 13.

If desired, the square law spring 62 of Fig. 4 may be replaced, as shown in Fig. 4A, by a series of springs 162, 262, 362, the upper ends of which are brought successively into abutment with the casing 63 as the right hand end of the lever 47 moves inwardly in response to increase in airspeed. The relation between control pressure and dynamic air pressure will then be represented by a series of straight lines AX, XY, YX (Fig. 13) and by suitable choice of the springs 162, 262, 362 this relation may be made an acceptably close approximation to the curve AC.

Figure 5:
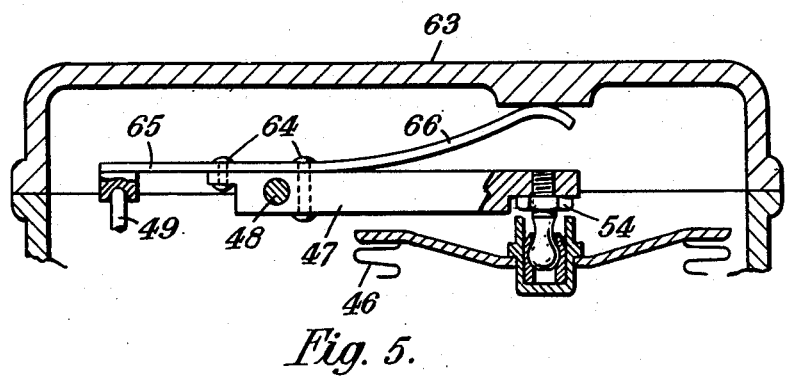

An alternative construction working on a similar principle is shown in Fig. 5. Here, the flexible element between the lever 47 and the push rod 49 is constituted by the cantilever portion 65 of a leaf spring, attached to the lever 47 by rivets 64. The square law spring between the lever 47 and the casing 63 is formed by an extension 66 of the same leaf spring. As the portion 65 of the spring is deflected with increasing loads, the rigid lever 47 will progressively alter its contact point with the extension 66 of the spring, thus reducing the effective length of the latter. With increasing pressures the extension 66 is therefore equivalent to the square law helical spring 62 of Fig. 4.

Figure 6:
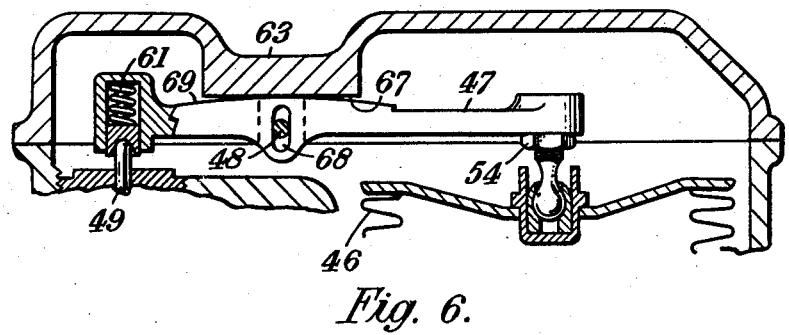

A further method of varying the characteristic is shown in Fig. 6. Here the lever 47 is arranged to deflect progressively by the inclusion of the spring 61 between the lever 47 and the push rod 49 as before, but the fulcrum of the lever 47 is constituted by a surface 67 on the casing 63, the lever 47 having a slot 68 engaging its pivot pin 48 and having a cam surface 69 coacting with the surface 67. As the lever 47 is deflected with increasing pressures the fulcrum point changes, thus varying the effective lever ratio and the characteristic of the control.

Figure 7:
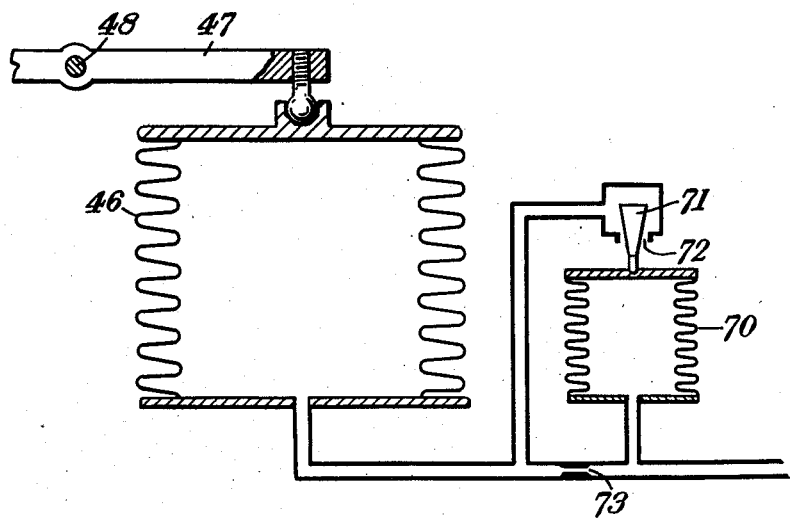

In the scheme shown in Fig. 7, a controlled air bleed is arranged to modify the pressure of the bellows 46. As will be seen, a small capsule 70, subject internally to pitot pressure and externally to atmospheric pressure controls the position of a tapered needle 71 in an orifice 72 and the resulting air flow passing through the restricted orifice 73 will decrease the pressure in the bellows 46. As the capsule 70 is extended at increasing pitot pressures, by suitably profiling the needle 71 the characteristics can be varied.

Figure 8:
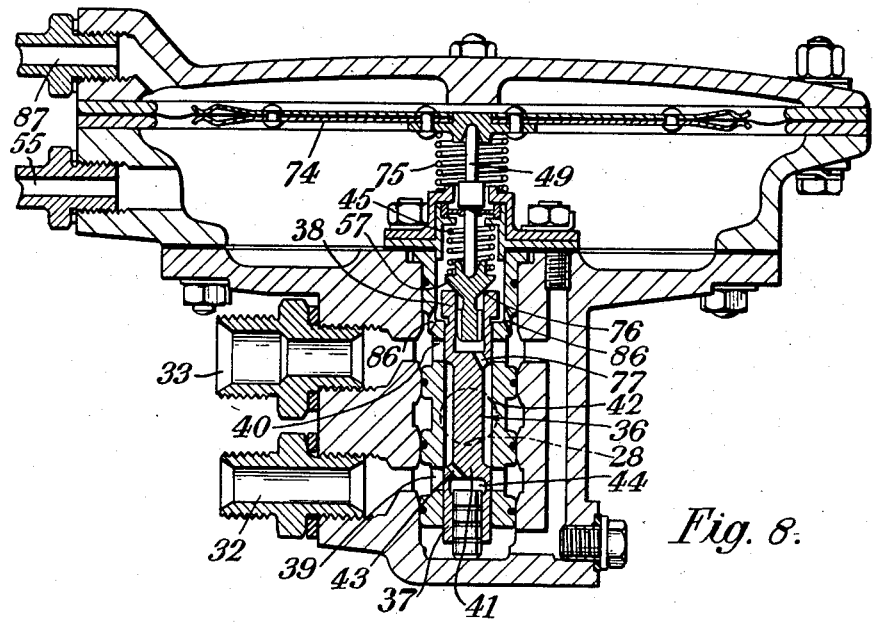
Fig. 8 is a longitudinal section through an alternative form of feel simulator.
Figure 9:
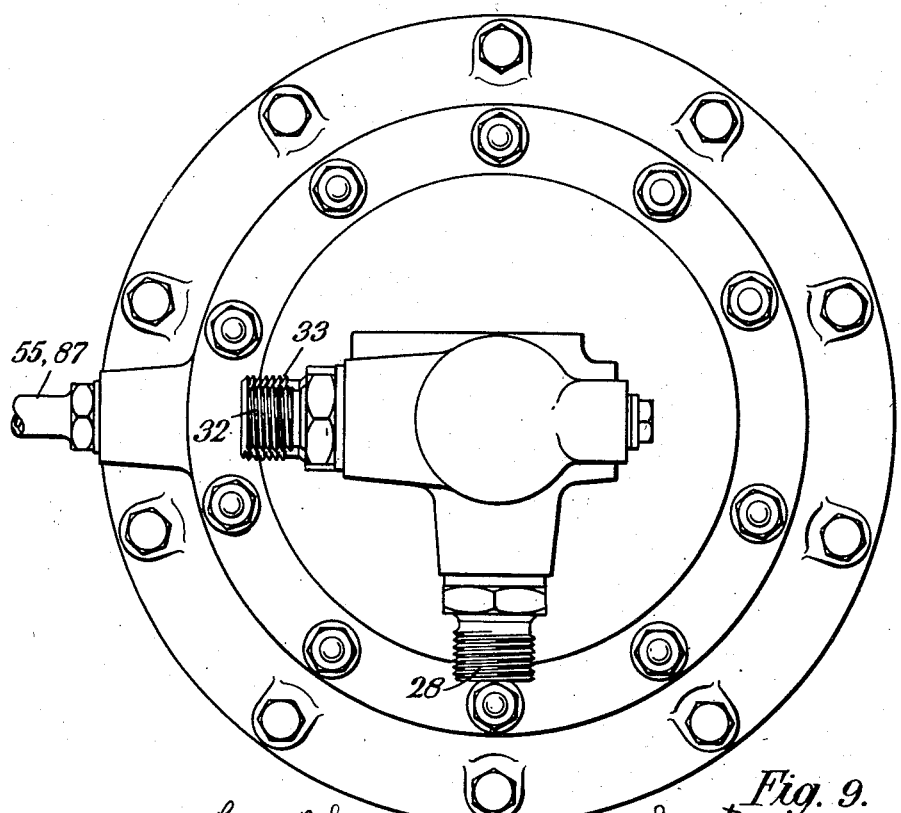
Fig. 9 is a corresponding underside plan view.

In the feel simulator shown in Figs. 8 and 9, the bellows 46 of the constructions so far described is replaced by a diaphragm 74 exposed at its upper surface, as seen in Fig. 8, to dynamic air pressure applied through the inlet 37 and exposed at its undersurface to static air pressure applied through the inlet 55. The control valve 36 and its associated ports and passages are similar to the corresponding mechanism in Fig. 2, except that there is no first stage pressure reduction at the inlet 32. The outlet 28 supplies control pressure to a cylinder similar to the cylinder 22 of Fig. 2. A spring 75 maintains the diaphragm 74 inoperative on the push rod 49 at low airspeeds, the control pressure then being determined solely by the spring 45 acting on the upper end of the control valve 36. As will be understood from the foregoing description of Fig. 2, as soon as the diaphragm 74 becomes operative, at higher speeds, on the push rod 49, the control pressure will begin to increase with increasing airspeed. The relief valve 57 is disposed between the diaphragm 74 and the control valve 36. It is normally held closed by the push rod 49 assisted by the pressure of the spring 57 against a seating 76 on top of the control valve and it is subjected at its undersurface to the control pressure through a passage 77. When the control pressure becomes excessive, as the result of seizure of the control valve 36, the relief valve 57 will lift to allow flow of liquid from the cylinder of the feel simulator to the exhaust outlet 33 via a passage 86.

Figure 10:
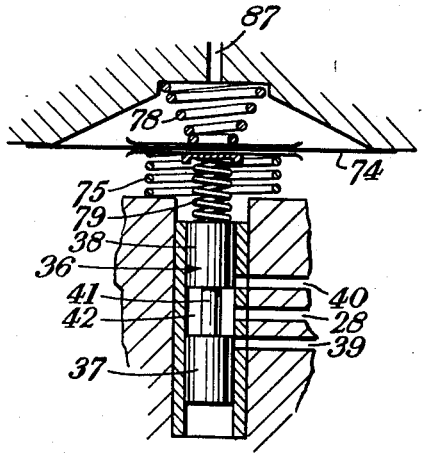
Figs. 10–12 are diagrammatic views showing modifications of the apparatus shown in Figs. 8 and 9, and Figs. 13–15 are graphs.
Figure 11:
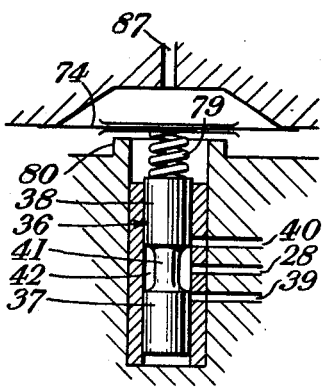
Figure 12:
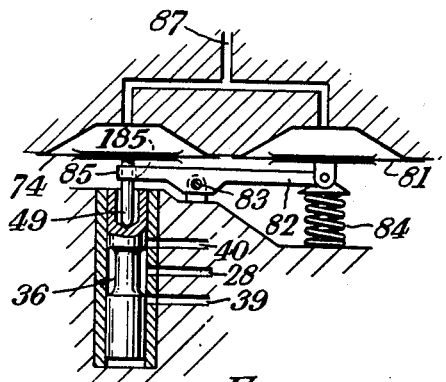

Figs. 10–12 show diagrammatically modifications of the arrangement of Figs. 8 and 9. Fig. 10 shows an arrangement in which the control pressure is made proportional to a power of V higher than $V^2$, as indicated by the curve $A_2D_2$ in Fig. 13. As previously indicated, the line AB represents a case, such as that shown in Fig. 2, in which the airspeed-responsive device exerts on the control valve 36 a pressure directly proportional to pitot pressure and in which the control pressure is accordingly proportional to $V^2$. The curve A. C. to the right of line AB represents the case, shown for example in Fig. 4, in which a spring counteracts the pressure exerted on the control valve 36 by the airspeed-responsive device and in which the control pressure is accordingly proportional to a power of V less than $V^2$. By providing, as shown in Fig. 10, a spring which assists the pressure exerted on the control valve 36 by the airspeed-responsive device it is possible to achieve the condition shown by the curve AD, which lies to the left of line AB and accordingly represents a case in which the control pressure is proportional to a power of V greater than $V^2$, for example $V^3$. In Fig. 10 a square law spring 78 assists the dynamic air pressure acting on the top of the diaphragm 74, and a spring 79 is interposed between the diaphragm and the control valve 36, so allowing of progressive downward deflection of the diaphragm in response to increase in pitot pressure. The spring 75 balances the pre-load of the spring 78, so that at zero pitot pressure no force is applied to the control valve. As the pitot pressure is raised, the spring 79 is compressed and the square law spring 78 is extended. The instantaneous spring rate of the spring 78 therefore decreases and the overall result is that the springs modify the pressure applied by the diaphragm 74 to the control valve 36 in such a way that the control pressure is proportional to $V^3$. By suitable selection of the law of the spring 78, the control pressure may be made to vary with some other power of V higher than $V^2$. If the characteristics of the springs 78 and 79 were identical, the control pressure would be directly proportional to the air pressure and therefore to $V^2$ as indicated by the line AB in Fig. 13. By providing a spring 78 which has a decreasing rate as it extends and which is initially in a compressed condition, it is possible, however, to produce a control pressure which is proportional to a power of V in excess of $V^2$. This is because the spring 78 affords decreasing assistance to the air pressure as the diaphragm 74 moves downwards. The resulting curve relating control pressure to air pressure is indicated by AD in Fig. 13. In order that there should be no finite control pressure A at zero air pressure, the spring 75 is provided to balance the pre-load of the spring 78, thus giving the curve relating control pressure to air pressure indicated at $A_2D_2$ in Fig. 13.

Figure 14:
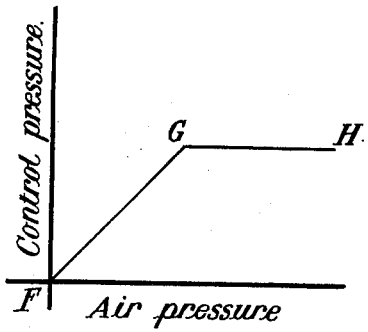

It is sometimes desired that, as indicated by the line FGH in Fig. 14, the control pressure should be proportional to $V^2$ up to a critical airspeed, and should thereafter remain constant on further increase in airspeed. This can be achieved as indicated in Fig. 11. In this case a spring 79 is interposed between the diaphragm 74 and the control valve 36 and an abutment 80 limits the downward travel of the diaphragm. Accordingly, when the airspeed is attained at which the diaphragm 74 contacts the abutment 80, the diaphragm is arrested. It is consequently unable to move downwards in response to a further increase in airspeed and is therefore incapable of actuating the valve 36 to produce any further increase in control pressure beyond that represented by the point G.

Figure 15:
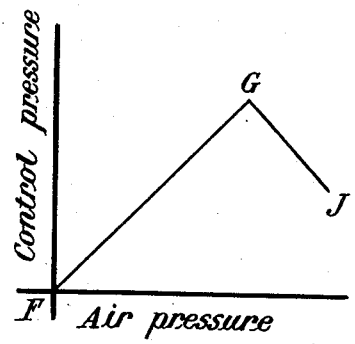

Sometimes, it is desired that, as indicated by the line FGJ in Fig. 15, the control pressure should be proportional to $V^2$ up to a critical airspeed and should thereafter decrease on further increase in the airspeed. This can be achieved as indicated in Fig. 12. In this case there is provided an additional diaphragm 81, subject to pitot pressure at its upper surface and to static pressure at its undersurface. The diaphragm 81 is connected to one end of a lever 82 pivoted at 83 and formed with a hole 185 through which the push rod 49 passes with clearance. As the airspeed increases, the diaphragm 81 will deflect the lever 82 clockwise until, at a given critical airspeed determined by the loading of a spring 84, a nose 85 on the lever 82 is brought into contact with the undersurface of the diaphragm 74. Until the critical airspeed is reached, the spring 84 maintains the lever 82 clear of the diaphragm 74, which controls the control pressure as indicated by FG in Fig. 15. At the point G the diaphragm 81 commences to exert on the control valve a force opposing that exerted by the diaphragm 74 and increasing progressively with further increase in the airspeed, causing the control pressure to fall off as indicated by GJ.

By appropriate selection of the areas of the diaphragms 74, 81 (Fig. 12) we can arrange for the portion GJ of the curve shown in Fig. 15 to extend horizontally, or upwardly at a slope less than that of FG, instead of downwardly as shown in Fig. 15.

What we claim as our invention and desire to secure by Letters Patent is:

1. In an aircraft, comprising a control surface, and a pilot's control member for actuating said control surface, a feel simulator comprising, in combination with said control member, a piston, a housing for said piston having an outlet, means connected to said control member and effective on movement thereof in either direction from a neutral position to cause relative movement of said piston and housing and thereby to expel liquid from said housing through said outlet, a piston-type control valve normally closing said outlet, pressure and exhaust ports controlled by said control valve for respectively supplying liquid to and exhausting it from said housing, said control valve moving from its normal position to connect said outlet to said pressure port and to said exhaust port in response respectively to movement of said control member towards and away from its neutral position, a conduit for subjecting one end of said control valve to the hydraulic pressure in said housing, a device responsive to changes in airspeed, and means actuated by said airspeed-responsive device for exerting on the other end of said control valve a force opposing said hydraulic pressure and increasing with increase in airspeed over a predetermined range of airspeeds, said control valve being movable from its normal position, in response to increase and decrease in said force, to connect said outlet to said inlet port and to said exhaust port respectively.

2. Apparatus as claimed in claim 1, wherein said airspeed-responsive device is a diaphragm subject at one side to ram pressure and at the other side to atmospheric pressure and wherein the means actuated by said airspeed-responsive device is constituted by a push rod interposed between said diaphragm and the control valve.

3. Apparatus as claimed in claim 1, wherein said airspeed-responsive device is a bellows subjected internally to ram pressure and externally to atmospheric pressure.

4. Apparatus as claimed in claim 1, comprising a spring loading the control valve in opposition to the hydraulic pressure in the housing and wherein the airspeed-responsive device is inoperative on the control valve at low airspeeds.

5. Apparatus as claimed in claim 1, comprising a relief valve, subject to the hydraulic pressure in the housing and normally held closed by a force derived from the airspeed-responsive device, said relief valve being arranged to open, when the pressure in the housing becomes excessive, to permit of escape of liquid from the housing.

6. Apparatus as claimed in claim 1, wherein said airspeed-responsive device is a diaphragm subject at one side to ram pressure and at the other side to atmospheric pressure, and comprising a relief valve interposed between said diaphragm and said control valve and serving to transmit said force from said diaphragm to said control valve, and a conduit for subjecting the end of said relief valve adjoining the control valve to the hydraulic pressure in said housing.

7. Apparatus according to claim 1, comprising a stop arranged, when a predetermined airspeed is attained, to contact the airspeed-responsive device and thereby prevent further movement thereof.

8. In an aircraft, comprising a control surface and a pilot's control member for actuating said control surface, a feel simulator comprising, in combination with said control member, a piston, a housing for said piston having an outlet, means connected to said control member and effective on movement thereof in either direction from a neutral position to cause relative movement of said piston and housing and thereby to expel liquid from said housing through said outlet, a control valve normally closing said outlet and movable in opposite directions from its normal position, in response respectively to movement of said control member towards and away from its neutral position, to permit liquid to flow into and out of said housing, said control valve being subject to the hydraulic pressure in said housing, a device responsive to changes in airspeed and arranged to generate a force which increases with increase in airspeed, a resilient connection for applying said force from said airspeed-responsive device to said control valve in opposition to said hydraulic pressure, said control valve being movable from its normal position, in response to changes in said force, to establish in said housing a hydraulic pressure which increases with airspeed over said predetermined range, and means for modifying, as the airspeed increases, the force effectively transmitted from said airspeed-responsive device to said control valve so that the hydraulic pressure in said housing is proportional to a power of the airspeed other than the square.

9. Apparatus according to claim 8, wherein said airspeed-responsive device is subject at one side to ram pressure and at the other to atmospheric pressure and the modifying means is a spring acting on the airspeed-responsive device in opposition to the ram pressure.

10. Apparatus according to claim 8, wherein said airspeed-responsive device is subject at one side to ram pressure and at the other to atmospheric pressure and the modifying means is a spring assisting the ram pressure acting on the airspeed-responsive device.

11. In an aircraft, comprising a control surface and a pilot's control member for actuating said control surface, a feel simulator comprising, in combination with said control member, a piston, a housing for said piston having an outlet, means connected to said control member and effective on movement thereof in either direction from a neutral position to cause relative movement of said piston and housing and thereby to expel liquid from said housing through said outlet, a control valve normally closing said outlet and movable in opposite directions from its normal position, in response respectively to movement of said control member towards and away from its neutral position, to permit liquid to flow into and out of said housing, said control valve being subject to the hydraulic pressure in said housing, a device responsive to changes in airspeed and arranged to generate a force which increases with increase in airspeed, a pivoted lever connected at one end to the airspeed-responsive device, and a leaf spring interposed between the other end of said lever and said control valve and arranged to change its point of contact with said lever as the airspeed increases, said leaf spring applying to said control valve in opposition to said hydraulic pressure the force generated by said airspeed-responsive device and said control valve being movable from its normal position, in response to changes in said force, to establish in said housing a hydraulic pressure which increases with airspeed.

12. In an aircraft, comprising a control surface and a pilot's control member for actuating said control surface, a feel simulator comprising, in combination with said control member, a piston, a housing for said piston having an outlet, means connected to said control member and effective on movement thereof in either direction from a neutral position to cause relative movement of said piston and housing and thereby to expel liquid from said housing through said outlet, a control valve normally closing said outlet and movable in opposite directions from its normal position, in response respectively to movement of said control member towards and away from its neutral position, to permit liquid to flow into and out of said housing, said control valve being subject to the hydraulic pressure in said housing, a device responsive to changes in airspeed and arranged to generate a force which increases with increase in airspeed, a pivoted lever connected at one end to the airspeed-responsive device, and a spring interposed between the other end of said lever and the control valve for applying to said control valve in opposition to said hydraulic pressure the force generated by said airspeed-responsive device, said lever having a fulcrum point which changes in response to increase in the airspeed and said control valve being movable from its normal position, in response to changes in said force, to establish in said housing a hydraulic pressure which increases with airspeed.

13. Apparatus according to claim 8, wherein said airspeed-responsive device is subject at one side to ram pressure and at the other to atmospheric pressure and comprising a controlled air bleed from the side of the airspeed-responsive device exposed to ram pressure, which increases progressively with increase in the airspeed.

14. In an aircraft, comprising a control surface and a pilot's control member for actuating said control surface, a feel simulator comprising, in combination with said control member, a piston, a housing for said piston having an outlet, means connected to said control member and effective on movement thereof in either direction from a neutral position to cause relative movement of said piston and housing and thereby to expel liquid from said housing through said outlet, a control valve normally closing said outlet and movable in opposite directions from its normal position, in response respectively to movement of said control member towards and away from its neutral position, to permit liquid to flow into and out of said housing, said control valve being subject to the hydraulic pressure in said housing, a first device responsive to changes in airspeed, means actuated by said airspeed-responsive device for exerting on said control valve a force opposing said hydraulic pressure and increasing with increase in airspeed over a predetermined range of airspeeds, said control valve being movable from its normal position, in response to changes in said force, to establish in said housing a hydraulic pressure which increases with airspeed over said predetermined range, a normally ineffective second airspeed-responsive device arranged, when a predetermined airspeed is attained, to act on the control valve in opposition to the first airspeed-responsive device and thereafter to modify the control exerted by the first airspeed-responsive device on the hydraulic pressure in the housing.

15. In an aircraft, comprising a control surface and a pilot's control member for actuating said control surface, a feel simulator comprising, in combination with said control member, a piston, a housing for said piston having an outlet, a linkage connecting said control member and said piston for moving said piston in said cylinder to expel liquid from said housing through said outlet when said control member is moved in either direction from a neutral position, said linkage being such that said piston imposes a hydraulic resistance to movement of said control member which increases with displacement thereof from its neutral position, a piston-type control valve normally closing said outlet and movable in opposite directions from its normal position, in response respectively to movement of said control member towards and away from its neutral position, to permit liquid to flow into and out of said housing, a conduit for subjecting one end of said control valve to the hydraulic pressure in said housing, a device responsive to changes in airspeed, and means actuated by said airspeed-responsive device for exerting on the other end of said control valve a force opposing said hydraulic pressure and increasing with increase in airspeed over a predetermined range of airspeeds, said control valve being movable from its normal position, in response to changes in said force, to establish in said housing a hydraulic pressure which increases with airspeed over said predetermined range.

References Cited in the file of this patent

UNITED STATES PATENTS

| | | |
|---|---|---|
| 2,160,194 | Bates | May 30, 1939 |
| 2,205,610 | Van Nes | June 25, 1940 |
| 2,445,343 | Tyra | July 20, 1948 |
| 2,508,883 | Knowler et al. | May 23, 1950 |
| 2,548,481 | Knowler et al. | Apr. 10, 1951 |
| 2,627,847 | Clark et al. | Feb. 10, 1953 |
| 2,638,289 | McKellar et al. | May 12, 1953 |
| 2,678,179 | Teeney et al. | May 11, 1954 |
| 2,724,565 | Trevaskis | Nov. 22, 1955 |